Jan. 31, 1961 J. A. SINCLAIR 2,969,593
LAWN AND GARDEN TOOLS
Filed Jan. 6, 1960
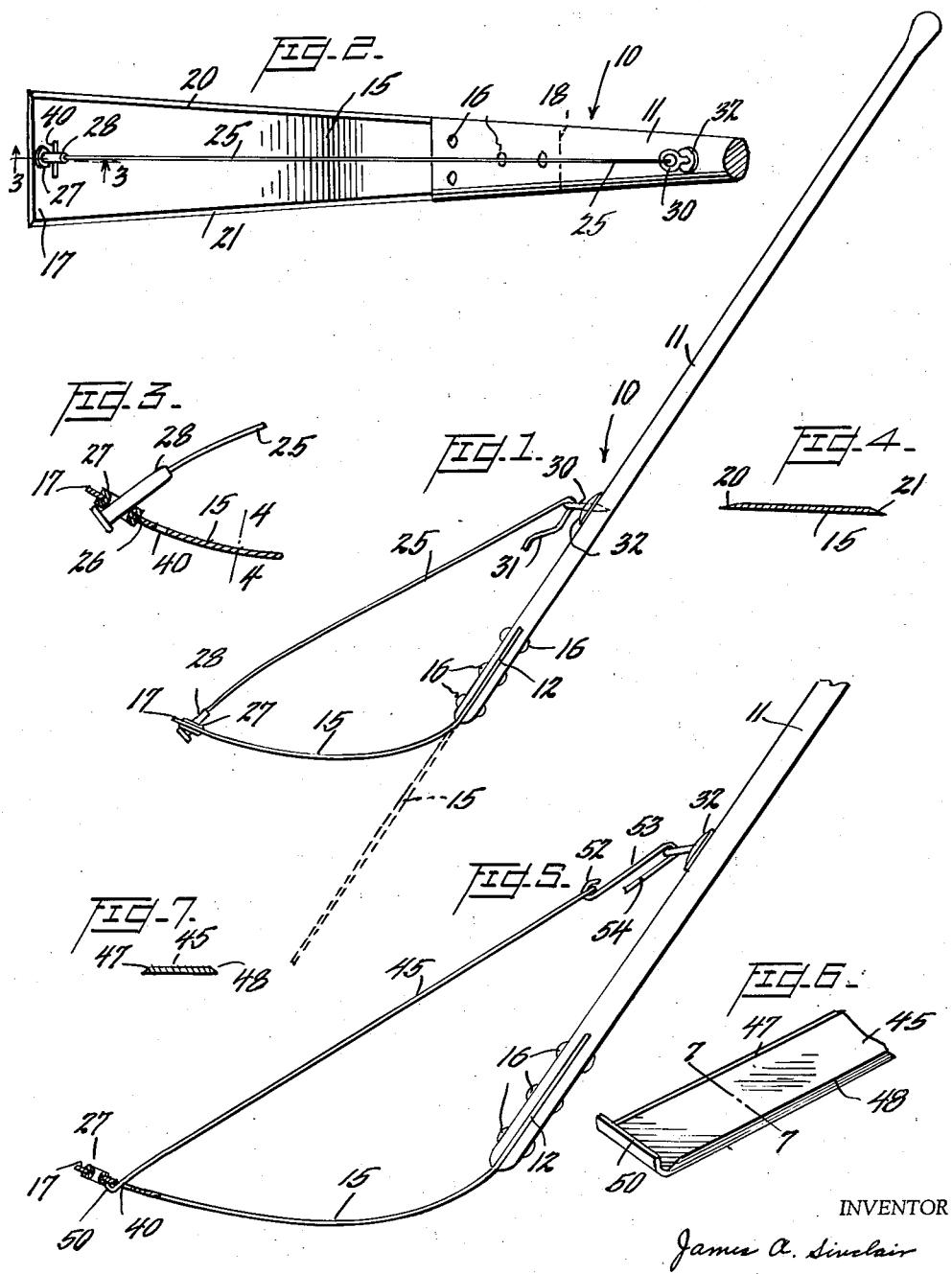
INVENTOR
James A. Sinclair
BY Watson, Cole, Grindle & Watson
ATTORNEYS

United States Patent Office 2,969,593
Patented Jan. 31, 1961

2,969,593

LAWN AND GARDEN TOOLS

James A. Sinclair, The Jimsin Co., P.O. Box 238, Franklin, La.

Filed Jan. 6, 1960, Ser. No. 829

5 Claims. (Cl. 30—318)

This invention relates to lawn and garden tools and more particularly to a manual instrument for cutting weeds, vines, and brush and for trimming lawns.

The general object of the invention is the provision of a novel and improved cutting tool of this class which is light in weight, easy to handle, economical in manufacture, and which is so constructed and arranged as to most efficiently cut or trim the vegetation on which it is used.

The invention, in its preferred embodiments, contemplates the provision of a manually wielded cutter adapted in certain arrangements to be swung like a golf club or a hockey stick, the operator, of course, using the cutter while in a standing position. Other and prior devices intended for similar purposes have been produced for manipulation in the same manner, but the configuration of the blade of the present device increases the cutting efficiency and the "feel" of the implement many fold. In its simplest unstressed form the tool comprises a broad, flexible, resilient blade having knife edges on both sides and its shank rigidly secured to a straight handle. The blade is widest at its distal end and the handle is preferably of wood and may conveniently be of a construction similar to an ordinary double bit axe handle, or even somewhat lighter.

For cutting weeds or trimming lawn grass the device is adjusted so that the resilient cutting blade is sprung to an arcuate curvature by means of a tension element such as a wire, one end of which is detachably secured to the broad outer end portion of the blade and the other end clipped to the handle of the tool at a point well above the shank end of the blade.

Another feature of the invention is the provision of an alternative form of tension element which is adapted to be attached or installed in a similar fashion to draw the main blade of the cutter to an arcuate configuration, but which in itself comprises a flat, supplemental double-edged blade, adapted to further sever the longer types of weeds or grass, and prevent or minimize entanglement of the tool with the growth being cut or trimmed.

Other objects and features of novelty will be apparent from the following specification when read in connection with the accompanying drawings in which certain embodiments of the invention are illustrated by way of example.

In the drawings:

Figure 1 is a view in side elevation of a tool comprising one embodiment of the invention;

Figure 2 is a fragmentary plan view of the tool shown in Figure 1;

Figure 3 is an enlarged sectional view taken on line 3—3 of Figure 2;

Figure 4 is a transverse sectional view taken on line 4—4 of Figure 3;

Figure 5 is a view similar to Figure 1, but on a somewhat enlarged scale, showing another form of the invention;

Figure 6 is a fragmentary perspective view of the distal end of the bracing and tensioning element shown in Figure 5; and Figure 7 is a transverse sectional view taken on line 7—7 of Figure 6.

As best shown in Figures 1 and 2, the first embodiment of the invention, designated generally by the number 10, comprises a straight elongated handle 11 which is preferably made of wood although it could be made of metal, plastic, or other suitable material. The lower end of the handle 11 is split or kerfed as at 12 for the reception of the narrowed shank end of the cutting blade 15. The blade and handle elements at the kerfed portion are provided with registering openings to receive the rivets 16 which securely fix the blade to the handle.

As best shown in Figure 2 of the drawings, the blade tapers somewhat with the remote or distal end 17 being widest and the inner or shank portion terminating at a somewhat narrowed end edge 18. Both side margins of the blade, indicated at 20 and 21, are ground to a keen edge as shown in Figure 4 of the drawings.

Thus far there has been described a preliminary stage of manufacture which is indicated or suggested by the broken lines in Figure 1 of the drawings, wherein the blade 15 extends in a substantially straight line from the handle. For some special purposes it could be used in this preliminary condition, such as in trimming weeds along ditches, cutting high vines, or other specialized jobs. However the primary purpose and function of the blade is in cutting weeds and trimming lawns, using a stroke similar to that employed in playing golf or hockey.

For this purpose the blade 15 which is preferably made of tempered steel and is somewhat flexible and resilient, is sprung to an arcuate or curved configuration as shown in Figure 1 in solid lines. For this purpose the distal end 17 of the blade 15 is connected with a point on the handle by means of a tension element 25 which in this embodiment comprises a stiff wire. Near the end 17 of the blade, as best shown in Figure 3, there is an opening 26 into which a grommet 27 may be inserted and through which a headed terminal element 28 may pass, this element being fixably or adjustably secured to the end of the tension wire 25.

At a point on the handle 11 well above the shank end 12 of the blade 15, a screw eye 30 is fixed to the handle, and the hooked end portion 31 of the tension wire 25 passed through this eye. If desired, a bowed washer element 32 may be installed beneath the eye of the screw.

With the blade curved in this fashion and the wider end of the blade outermost, the blade angularity is optimum and a highly efficient cutting action is attained by the double knife edges 20 and 21, while at the same time maintaining very good balance in handling the tool.

In Figures 5, 6 and 7 of the drawings there is utilized an alternative embodiment of the invention which features a different type of tension member which also has a cutting function. The same type of blade 25 is used and is secured to the handle 11 by means of the rivets 16.

However, in this embodiment the narrow transverse elongated slot 40 formed in the blade near its distal end is employed in attaching the tension member. In this case the tension element indicated at 45 comprises a flat strip of the cross-sectional configuration indicated in Figures 6 and 7 which includes the provision of knife edges 47 and 48 upon each side of the strip.

The outer end of the tension strip 45 is bent upwardly or flanged as at 50 and this flanged end is first inserted through the slot 40 in the blade 15, and then when the strip 45 is brought to the proper angularity indicated in Figure 5 the flanged end 50 securely locks the distal end of the strip to the blade.

The inward end of the tension strip 45 is provided with an opening through which the hooked end 52 of the clip 53 extends. The longer hooked end 54 of the clip is passed through the eye 30 and thus detachably connects the tension strip with the handle 11.

In the case of this latter embodiment it will be seen that in cutting exceedingly tall grass or weeds the double cutting edges on the tension strip 45 will sever the upper portions of such vegetation and prevent or minimize entanglement or clogging of the tool with the tall weeds or grasses.

It will be thus seen that there has been provided by the present invention a highly efficient cutter characterized by ability to cut heavy, high grasses or trim a lawn as neatly as a lawnmower, while at the same time manifesting great ease of handling. The tool is particularly efficient in trimming lawns around flower bed borders, driveways, and sidewalks as well as on wide areas of the lawn.

The springing of the blade and application of the tension element is very easily accomplished by seizing the handle and bowing the blade by pressing the end of the blade against the floor or ground and then applying the tension element by hooking the terminal connecters in place. These connections, because of the tension stress of the blade, will not disengage while the tool is in use.

It is understood that various changes and alterations may be made in the embodiment illustrated and described herein without departing from the scope of the invention as defined by the following claims.

Having thus described the invention, what is claimed as new and desired to be secured by Letters Patent is:

1. A tool for cutting or trimming vegetation comprising a handle, a flexible resilient blade, means for fixedly securing one end of the said blade to an end of said handle for extension in substantial alignment, and a tension element having one of its ends connected with the distal end of the blade and the other end connected to said handle, the length of said tension element being less than the distance along the blade and handle between the points of connection of said tension element, whereby the blade is sprung out of its planar condition to an arcuate curvature, said tension element comprising a narrow strip having a knife edge along at least one side to afford a supplemental cutting blade, a narrow slot formed in the distal end portion of the blade, one end of the tension element formed with a rigid flange whereby it may be secured to the blade by insertion of the flanged end through said slot, and detachable hook and eye means are provided for connecting the opposite end of said tension element to the handle.

2. An elongated garden tool for the stand-up cutting or trimming of vegetation comprising, in combination, a straight elongated handle member, a broad flat flexible resilient blade having cutting edges on each side thereof, means for fixedly securing one end of said blade to an end of said handle member for extending in substantial alignment therewith, and a separate flexibly resilient but self-sustainingly stiff tension element having one of its ends detachably interlocked with the distal end of the blade and the other end detachably connected with said handle member at a point above the place of securement of the blade; the means for effecting the detachable connection comprising an eye member rigid with said handle at said point, the plane of the eye intersecting the axis of the handle member and extending transversely to the common plane of the handle member and the tension element, and a hook element at the latter end of said tension element in detachable engagement with said eye, the plane of the hook element substantially coinciding with said common plane, the length of said tension element being less than the distance along the blade and handle between the points of connection of said tension element, whereby the blade is sprung out of its planar condition to an arcuate curvature, the transverse dimension of the blade at any point along its length being perpendicular to said common plane.

3. The garden tool as set forth in claim 2 in which the means for detachably interlocking one end of the tension element with the distal end of the blade comprises an opening provided in the distal end portion of said blade with the adjacent end of said tension element passed straight through said opening and headed upon the remote side thereof to prevent detachment at said end without first detaching the handle-connected end of said tension element.

4. An elongated garden tool for the stand-up cutting or trimming of vegetation comprising, in combination, a straight elongated handle member, a broad flat flexible resilient blade having cutting edges on each side thereof, means for fixedly securing one end of said blade to an end of said handle member for extending in substantial alignment therewith, and a separate flexibly resilient but self-sustainingly stiff tension element having one of its ends detachably interlocked with the distal end of the blade and the other end detachably connected with said handle member at a point above the place of securement of the blade; the means for effecting the detachable connection comprising an eye member rigid with said handle at said point, the plane of the eye intersecting the axis of the handle member and extending transversely to the common plane of the handle member and the tension element, and a hook element at the latter end of said tension element in detachable engagement with said eye, the plane of the hook element substantially coinciding with said common plane, the length of said tension element being less than the distance along the blade and handle between the points of connection of said tension element, whereby the blade is sprung out of its planar condition to an arcuate curvature, the transverse dimension of the blade at any point along its length being perpendicular to said common plane, said separate detachable tension element comprising a narrow flat strap member of very much less width than the blade but itself being provided upon each side with a cutting edge, whereby entanglement of weeds or longer vegetation with the tension element is prevented by the severing of such vegetation at that point.

5. The garden tool as set forth in claim 4 in which the opening in the blade is a narrow transversely extending slot, and the headed end portion of the tension element comprises a rigid integral terminal flange extending substantially at right angles to the adjacent main portions of the element, said flange adapted to be inserted through the slot in the blade before tensioning the element by securing its opposite end to the handle member.

References Cited in the file of this patent

UNITED STATES PATENTS

| 652,254 | Ellis | June 26, 1900 |
| 688,529 | Kretsinger | Dec. 10, 1901 |
| 924,124 | Worcester | June 8, 1909 |

FOREIGN PATENTS

| 584,192 | Great Britain | Jan. 9, 1947 |